United States Patent [19]

Lautzenhiser et al.

[11] Patent Number: 5,440,928
[45] Date of Patent: Aug. 15, 1995

[54] NULLING AND MEASURING SYSTEM

[75] Inventors: Theodore V. Lautzenhiser, Tulsa, Okla.; Karl Pelegrin, Evergreen, Colo.

[73] Assignee: Delta G Instruments, Inc., Evergreen, Colo.

[21] Appl. No.: 941,395

[22] Filed: Sep. 8, 1992

[51] Int. Cl.$^6$ .............................................. G01V 7/04
[52] U.S. Cl. ................................................ 73/382 G
[58] Field of Search ................. 73/382 R, 382 G, 383

[56] References Cited

U.S. PATENT DOCUMENTS

| | | | |
|---|---|---|---|
| 2,304,191 | 5/1939 | Mott-Smith | 73/382 R |
| 2,316,915 | 4/1943 | Truman | 73/382 R |
| 2,322,681 | 6/1943 | Zenor | 73/382 R |
| 2,367,126 | 12/1944 | James | 73/382 R |
| 2,732,718 | 1/1956 | Cornelison | 73/382 R |
| 2,738,676 | 3/1956 | Worden et al. | 73/382 R |
| 3,211,003 | 10/1965 | Worden | 73/382 R |
| 3,245,263 | 4/1966 | Cornelison | 73/383 |
| 3,713,088 | 1/1973 | Lehner et al. | 73/1 D |
| 4,422,329 | 12/1983 | Richards | 73/382 R |
| 5,177,471 | 1/1993 | Horibata | 340/690 |

*Primary Examiner*—Hezron E. Williams
*Assistant Examiner*—Christine K. Oda
*Attorney, Agent, or Firm*—James R. Young; Robert G. Crouch; Chrisman Bynum & Johnson

[57] ABSTRACT

A gravity meter includes a support framework which supports a suspension system having a weight beam to which a reaction mass is attached. The reaction mass includes a dielectric mass which extends partially within first and second cavities formed between respective first and second pairs of conductors. Changes in either the ambient gravitational field or the electric potential on the conductors causes the dielectric mass to move into the first cavity between the first pair of conductors and out of the second cavity between the second pair of conductors or vice-versa, with the force on the dielectric mass being linearly proportional to the voltage between the conductors. An optical detector system determines the position of the weight beam, thus the position of the dielectric mass, and is connected to the voltage source for the plates so that, by adjusting the electric potential between the plates, the weight beam can be moved to a nulled position. Subsequent changes in the ambient gravitational field caused either by movement of the meter or by a change in the ambient gravitational field over time will cause the reaction mass to move and cause the dielectric to move between the respective pairs of conductors. Thus, the required change in the electric potential necessary to renull the system allows remote calculation of the change in the gravitational field.

11 Claims, 5 Drawing Sheets

NULLING AND MEASURING SYSTEM

BACKGROUND OF THE INVENTION

1. Field of the Invention

The present invention relates to gravity meters in general and in particular to a gravity meter having an improved nulling and measuring system.

2. Background of the Invention

Gravity meters have long been used by geophysicists and others interested in the bulk in-situ measurement of rock densities. Most gravity meters utilize a weight disposed at one end of a horizontal weight arm with the other end of the arm being secured to a pivotal support. The weight arm is maintained at a desired reference position by a mainspring which is often secured to the end of a second support arm mounted to the frame of the instrument. The mainspring is selected to counteract the force of gravity acting on the weight arm over a specific range of gravity, and a mechanical adjustment system is usually attached to the support arm to balance the weight arm to a desired reference or null point. Once the gravity meter is hulled, a change in the ambient gravitational field between two observation stations, or a change in the ambient gravitational field at the same station over time, causes a displacement of the weight arm. The displacement of the weight arm may be measured and used to calculate the change in the gravitational field. In short, then, the gravity meter operates on the principle of balancing the force of gravity by varying the force applied by the spring to maintain the weight arm at the reference or null point.

A significant problem that confronts the use of such gravity meters arises as a result of the world-wide variance in the earth's gravitational field. As noted above, gravity meters are designed to operate within ranges determined by the characteristics of their mainsprings. The problem is that no mainspring has yet been capable of accurately responding to the full range of gravity variance encountered throughout the world while at the same time having suitable sensitivity for bore hole gravity measurements. Therefore, it is necessary to select a meter for use in each local area according to the gravity field range in that area. Users of these meters must, therefore, have several different meters to cover the complete range of gravity variance likely to be encountered.

Another significant problem confronting such gravity meters is the need to provide a nulling and measuring system that will accurately reflect movement of the reaction mass mounted on the weight arm, so that the changes in the ambient gravitational field can be calculated from the magnitude of that movement. For example, a gravity meter has been developed that has a readout system based on the position of a metal weight arm between two conductor plates. A square wave signal is placed on each plate with the signal normally being 180° out of phase. The position of the weight arm can be thus affected by imposing a direct current signal on a selected one of the plates while the position of the weight arm is determinable from monitoring the resultant signal generated on the weight arm from the two square wave signals.

As another example, a previous patent (U.S. Pat. No. 4,422,329), issued to one of the co-inventors herein, teaches an improved gravity meter having a novel support and suspension system for the weight arm and a unique hulling and sensor system to allow remote hulling of the gravity meter and the remote sensing of the change in the gravitational field. The nulling and measuring system of that invention utilizes a two plate conductor and dielectric system, which balances the torque force due to gravity with the combined force of the mainspring and the body force on the dielectric. Unfortunately, in that system, the body force on the dielectric is proportional to the square of the voltage imposed on the plates, which leads to difficulties in measuring the nulling force and can reduce the overall accuracy of the system. Moreover, that system is not capable of measuring directly the position of the weight arm, but instead relies on detecting the change in the capacitance of the two conductor plates. Therefore, if the weight arm of that system is against the limit stop, the operator has no way of knowing whether the lack of change in capacitance is attributable to an equilibrated condition wherein the forces are in balance, or whether the lack of change in capacitance is due to the weight arm being against the limit stop. Finally, while that system does provide a means for determining the absolute capacitance of the conductor plates, so the operator can determine whether the weight arm is against the limit stop, such absolute capacitance measurement is difficult, and drift and static build-up on the plates make such measurements unreliable at best.

SUMMARY OF THE INVENTION

Accordingly, it is a general object of this invention to provide an improved gravity meter having a linearized nulling and measuring system, wherein the nulling force is linearly proportional to the voltage imposed on the plates.

It is another general object of this invention to provide an improved method and apparatus for positively sensing the position of the weight arm of the gravity meter.

It is a further object of this invention to provide a quartz element gravity sensor which incorporates uphole and downhole electronics to control automatically the nulling of the meter and to measure the output of the meter and calculate the change in ambient gravitational field at a location remote from the meter.

To achieve the foregoing and other objects and in accordance with the purposes of the present invention, as embodied and broadly described herein, the improved nulling and measuring system according to this invention may comprise a support framework rigidly affixed inside a housing assembly with the support framework mounting a suspension system for a weight beam that supports a reaction mass including, in part, a dielectric mass. The suspension system includes first and second spindles mounted in parallel, spaced-apart relation between filament hinges. The weight beam is mounted to the first spindle and the first and second spindles are interconnected by means of a support arm attached to the first spindle and a temperature compensating arm attached to the second spindle with the ends of these arms being connected to opposite ends of a mainspring. Torque may be applied to the first spindle by means of a mechanical adjustment through a tension spring to counteract the ambient gravitation force on the reaction mass.

The dielectric mass on the weight beam is positioned partially within the spaces formed between first and second pairs of conductors which, in the preferred embodiment, are in the form of respective first and second pairs of parallel, spaced-apart plates. Suitable electric connections are made to these plates so that, as the electric potential on one pair of plates is increased while the other is decreased, the dielectric mass is drawn into the cavity between the pair of plates having the increased electric potential. An optical detector system determines the position of the weight beam, thus the position of the dielectric mass, and is connected to the voltage source for the plates so that, by adjusting the electric potential between the plates, the weight beam can be moved to a hulled position. Subsequent changes in the ambient gravitational field caused either by movement of the meter or by a change in the ambient gravitational field over time will cause the reaction mass to move, causing the dielectric mass to move between the respective pairs of conductors. Thus, the required change in the electric potential necessary to renull the system allows remote calculation of the change in the gravitational field.

The method of the present invention includes the steps of positioning the gravity meter at a first location and nulling the meter to a first nulled or equilibrium position by applying an electric potential to the first and second pairs of spaced-apart conductors, so that the weight beam is made motionless at that position. This nulled or first equilibrium position is determined by suitable optical position detector apparatus which senses the position of the weight beam. The meter is then moved to the next site and the operator renulls the device so that the weight beam is again positioned at the first or nulled position. The change in electric potential required to renull the system corresponds to the change in the gravitational field operating on the reaction mass connected to the weight beam.

Additional objects, advantages, and novel features of this invention shall be set forth in part in the description that follows, and in part will become apparent to those skilled in the art upon examination of the following or may be learned by the practice of the invention. The objects and the advantages of the invention may be realized and attained by means of the instrumentalities and in combinations particularly pointed out in the appended claims.

BRIEF DESCRIPTION OF THE DRAWINGS

The accompanying drawings, which are incorporated herein and form a part of the specification illustrate preferred embodiments of me present invention, and together with the description, serve to explain the principles of the invention. In the drawings.

DETAILED DESCRIPTION OF THE PREFERRED EMBODIMENT

The present invention is directed to a gravity meter capable of accurately measuring changes in ambient gravitational field and a method for making those measurements. The user of the preferred embodiment of the present invention may calibrate the gravity meter at a remote location and may also receive the output of the meter from this remote location in order to calculate changes in the ambient gravitational field which can occur either through movement of the device or through changes in the gravitational field over time. While the preferred embodiment of the improved gravity meter 10 according to the present invention is shown and described herein as it could be used with one particular kind of weight arm suspension system, numerous other weight arm suspension systems exist and could be substituted for the particular kind of weight arm suspension system shown in the preferred embodiment by persons having ordinary skill in the art after having become familiar with the details of this invention. Therefore, the present invention should not be regarded as limited to the particular weight arm suspension system shown and described herein.

Figure 1:
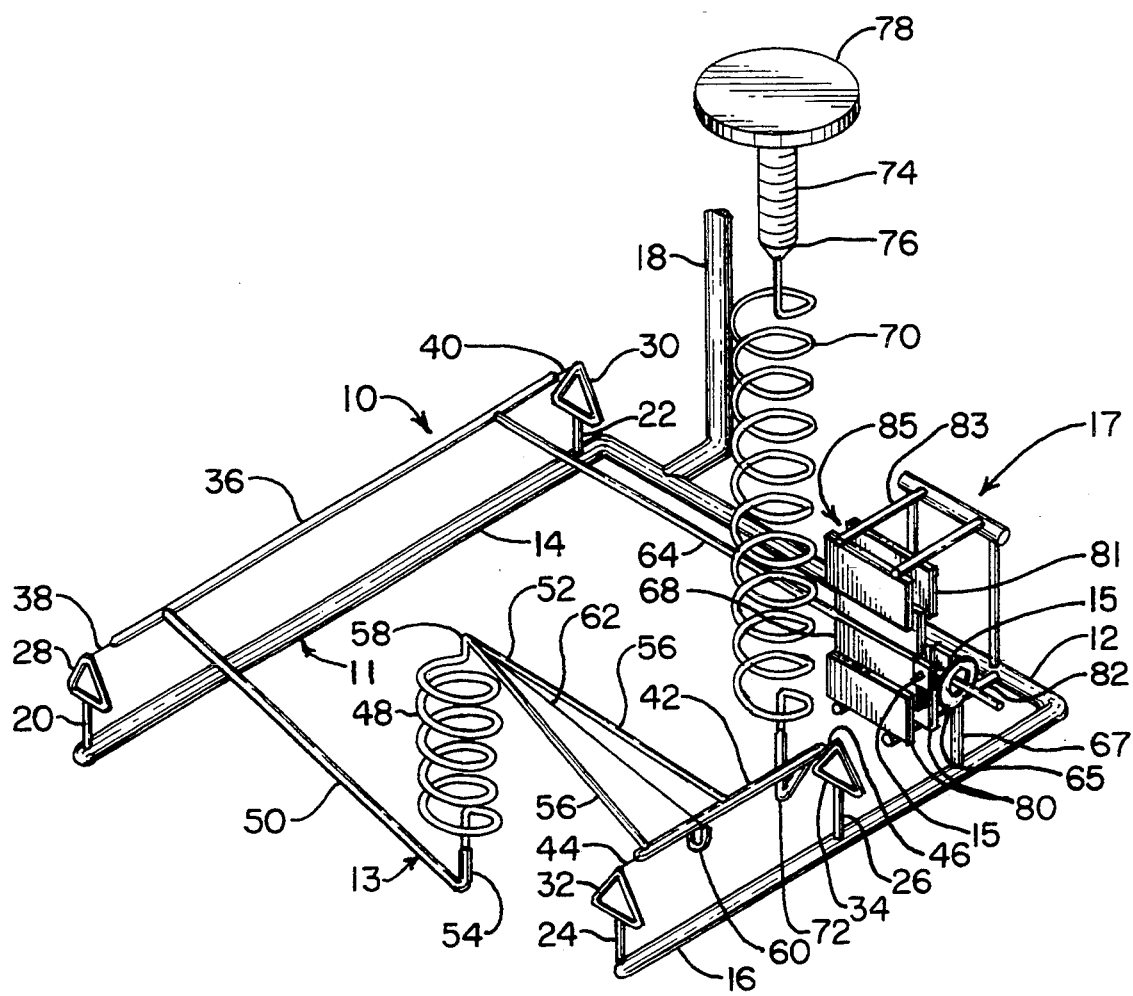
FIG. 1 is a perspective view of the suspension and framework assembly of a gravity meter according to the present invention.
Figure 2:
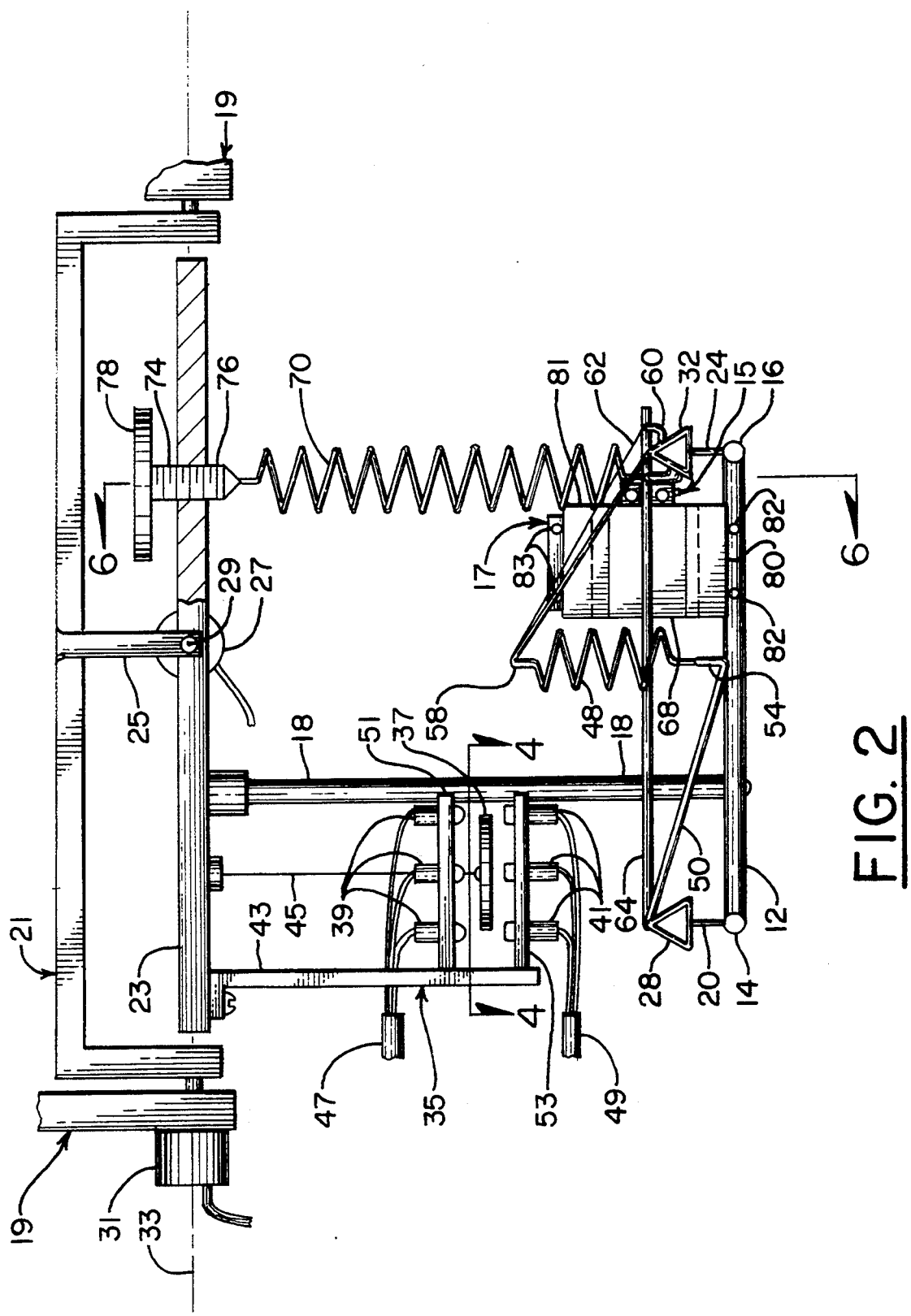
FIG. 2 is a side view in elevation of the gravity meter shown in FIG. 1 and also showing the gimbaled platform and platform level sensor assembly.

Briefly, the improved gravity meter 10 according to the present invention comprises a support framework 11 adapted to be attached to a module or sonde 19 via a gimbaled platform assembly 21 (see FIG. 2). Module 19 acts as a housing assembly for the gravity meter. A weight arm 64 and mainspring assembly 13 is mounted to the support framework 11, so that the weight arm 64 is free to move in response to changes in the gravitational field, as best seen in FIG. 1. A platform sensor assembly 35, an optical detection system 15, and a four plate conductor and dielectric nulling system 17 are all connected to control electronics 93 (shown in FIGS. 3 and 7 and described in greater detail below), and allow remote leveling of the gimbaled platform assembly 21, remote nulling of the gravity meter, and remote sensing of the change in the gravitational field. During operation, the optical detection system 15 and control electronics 93 detect the movement of the previously nulled weight arm 64 in response to a change in the gravitational field. The control electronics 93 then adjusts the voltage on the four plate conductor and dielectric nulling system 17, which moves the weight arm 64 back to the nulled position. The change in the gravitational field can thus be calculated from the voltage required to return the weight arm to the nulled position.

A significant advantage of the present invention is that the four plate conductor and dielectric system 17 results in a linear, as opposed to quadratic, relation between the voltage impressed on the plates and the resulting nulling force, thus improving accuracy and simplifying the computations required to determine the change in gravitational field strength. The four plate conductor and dielectric system 17 also eliminates static build-up on the plates, which was a common problem associated with prior, two conductor plate/dielectric systems. Another significant advantage associated with the present invention is that the optical detection system 15 can positively determine the exact position of the weight arm 64 without the need to measure the change of the absolute capacitance of the plates, with all its associated disadvantages.

Referring now to FIGS. 1 and 2 simultaneously, the gravity meter 10 according to the present invention generally comprises a support framework 11 adapted to be rigidly attached to module 19 via gimbaled platform assembly 21 (FIG. 2). In the preferred embodiment, the module 19 is in the form of a capsule adapted to be inserted down a well bore along with other instrumentation. All of the main elements of gravity meter 10 are formed from quartz, with support framework 11 being defined by quartz bars 12, 14, and 16 mounted in a generally U-shaped configuration with a mounting strut 18 extending from bar 12 for attaching the U-shaped framework 11 to the gimbaled platform assembly 21, so that the gravity meter 10 can be leveled for measurement, as will be described in greater detail below. Posts 20 and 22 extend upwardly from bar 14, and triangular members 28 and 30 are mounted to the upper ends of posts 20 and 22, respectively. Posts 24 and 26 extend upwardly from bar 16, with post 26 located at about the mid portion of bar 16. Triangular members 32 and 34 are mounted to the upper ends of posts 24 and 26, as best seen in FIG. 1. Each triangular member 28, 30, 32, and 34 is mounted to its respective post along the mid-portion of one of its sides, so that the remaining two sides converge upwardly to form an apex. This structure, then, defines the support framework 11 for the suspension assembly that forms the operating mechanism of gravity meter 10.

The suspension assembly includes a beam spindle 36 which is mounted at opposite ends to triangle members 28 and 30 by means of filament hinges 38 and 40. Similarly, a reset spindle 42 is mounted between triangle members 32 and 34 by means of filament hinges 44 and 46. Spindles 36 and 42 are generally parallel to one another and lie in a plane that is generally parallel to the plane of bars 12, 14, and 16.

Beam spindle 36 is connected to reset spindle 42 by means of a mainspring 48, a lower mainspring arm 50, and a mainspring support frame member 52. Specifically, lower mainspring arm 50 extends radially outward from beam spindle 36 in a direction generally toward spindle 42 and terminates in an upturned foot 54 which is connected to one end of mainspring 48. Mainspring support frame member 52 has a generally V-shaped configuration, being formed of a pair of legs 56 which are connected at one end to spindle 42 in spaced relation to one another and which converge to an apex 58 connected to the opposite end of mainspring 48. Legs 58 thus form a temperature compensated framework which is completed by the addition of a J-shaped curved finger 60 connected to spindle 42 between the ends of legs 56 and a tungsten filament 62 which extends from the end of finger 60 to apex 58.

A weight arm or beam 64 is attached to beam spindle 36 at an end thereof adjacent triangular support member 30 with beam 64 extending radially outward from beam spindle 36 generally in the plane of spindles 36 and 42. Beam 64 supports along its mid-portion a dielectric mass 68 which is in the form of a rectangular plate. The purpose and function of the dielectric plate 68 will be described below in greater detail. Further, as shown in FIG. 3, an eye 65 mounted to a support post 67 surrounds beam 64, which together act as a limit stop to prevent beam 64 from exceeding a desired magnitude of movement to avoid mechanical damage to the apparatus.

A gross tune or adjustment mechanism is provided by means of reset spring 70 which is connected at one end to reset spindle 42 by means of a V-shaped reset arm 72 which is rigidly attached at one end thereof to spindle 42 and at the other end to spring 70. A reset screw 74 has a shank 76 connected to the opposite end of reset spring 70 and a head 78 which is provided with any convenient indexing means (not shown). Further, reset screw 74 is mounted in any convenient manner to the platform assembly 21, so that the rotation of reset screw 74 changes the length of spring 70 which provides a gross calibration of gravity meter 10 to define a gravity range for measurement. Specifically, the spring force from spring 70 is passed through reset arm 72 to operate on reset spindle 42 which in turn adjusts the force on mainspring 48 through support frame member 52. The force of mainspring 48 then adjusts the position of beam 64 by operating on beam spindle 36.

Figure 3:
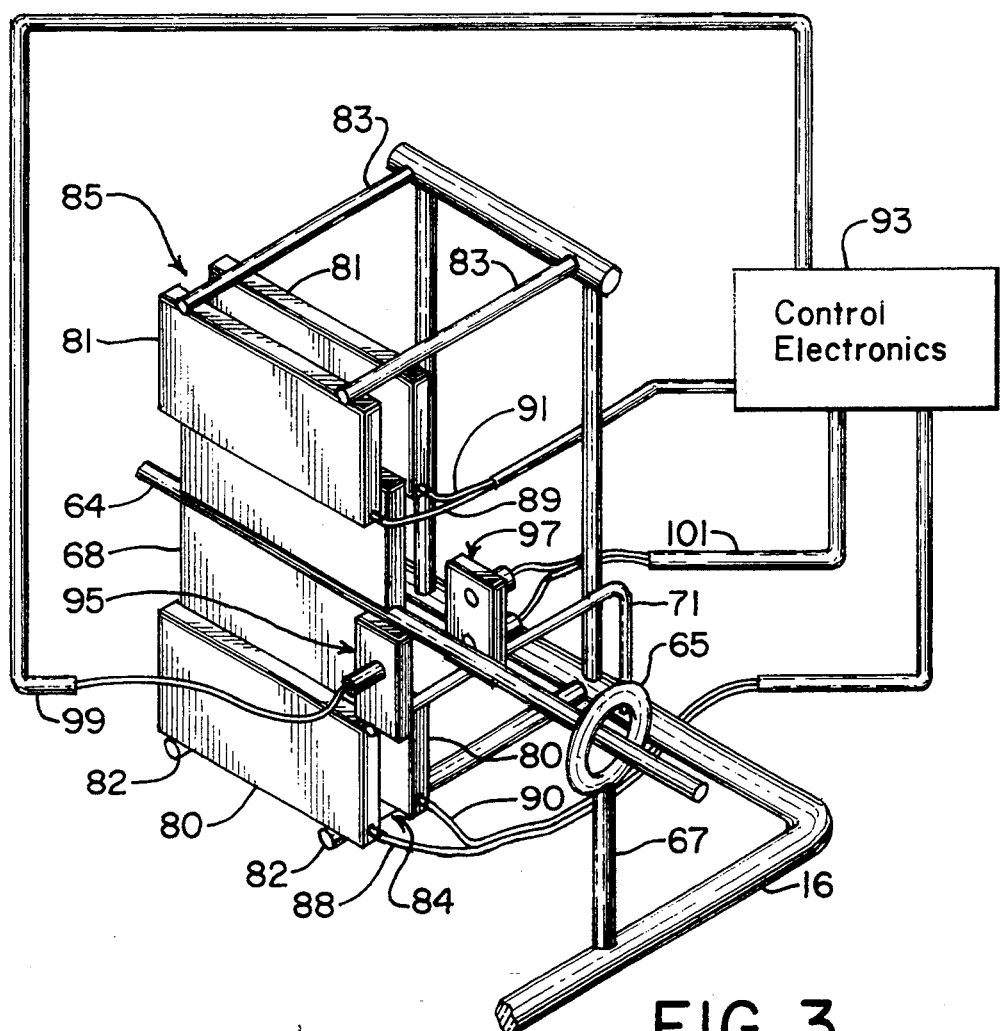
FIG. 3 is a perspective view of the four plate conductor and dielectric system and the optical detector system portions of the gravity meter shown in FIG. 1.

Gravity meter 10 also includes a first and second pair of conductor plates 80 and 81, respectively, which are supported by means of respective first and second pairs of rods 82 and 83, as best seen in FIGS. 1 and 3. The first and second pairs of conductor plates 80 and 81 are positioned in parallel, spaced-apart relation to define respective first and second cavities 84 and 85 therebetween. Leads 88 and 90 are connected to the first pair of conductor plates 80 and leads 89 and 91 are connected to the second pair of conductor plates 81, so that an electric potential may be placed on the respective pairs of plates by the control electronics 93, as will be described in detail below. Finally, gravity meter 10 is completed by mounting a light source assembly 95 and a detector assembly 97 to support arm 71, which positions light source assembly 95 and detector assembly 97 on opposite sides of weight arm 64. Light source assembly 95 and detector assembly 97 are also connected to the control electronics 93 via cables 99 and 101, respectively.

As was briefly described above, the gravity meter 10 is suspended from gimbaled platform assembly 21 via strut 18, so that it can be precisely leveled before taking measurements. Referring now to FIG. 2, gimbaled platform assembly 21 includes a platform 23 journaled in a two-axis gimbal frame 25 along a transverse axis 29 (perpendicular to the plane of the paper). Gimbal frame 25 is itself journaled to the module 19 along a longitudinal axis 33 that is orthogonal to transverse axis 29. A transverse servo motor 27 mounted on gimbal frame 25 and connected to platform 23 pivots platform 23 about transverse axis 29. Likewise, a longitudinal servo motor 31 mounted on module 19 and connected to gimbal frame 25 pivots frame 25 about longitudinal axis 33. A platform sensor assembly 35 mounted to the platform 23 via strut 43 and connected to control electronics 93 senses whether the platform 23, thus gravity meter 10, is level. If the platform 23 is not level, the control electronics 93 actuate the transverse and longitudinal servo motors 27 and 31 to move the platform 23 until it is level, as will be described in more detail below.

Figure 4:
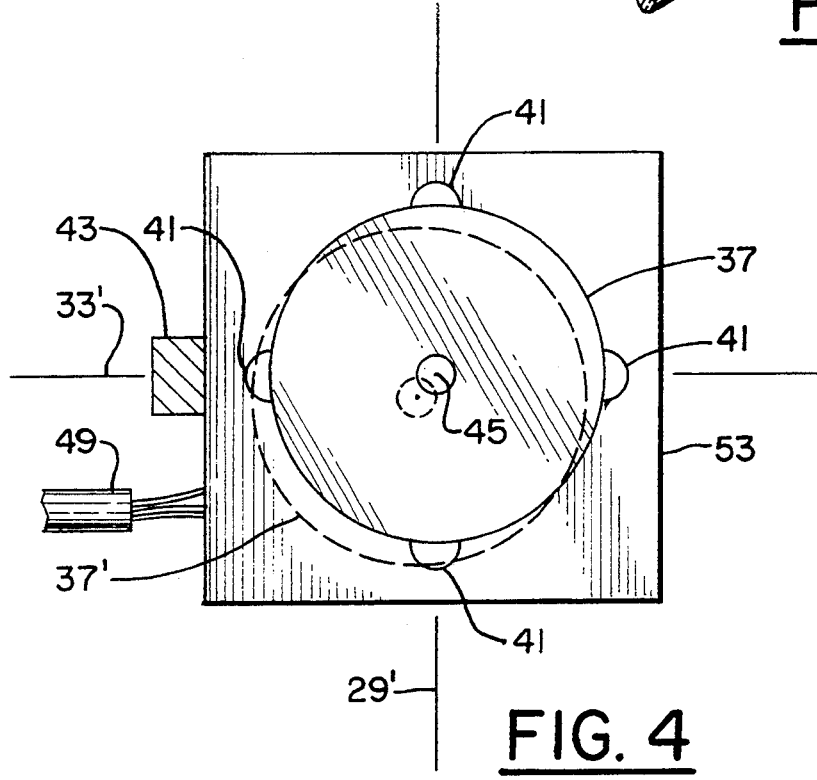
FIG. 4 is a plan view of the platform level sensor assembly taken along the line 4—4 of FIG. 2.

The details of the platform sensor assembly 35 are best seen by referring to FIGS. 2 and 4 simultaneously. Essentially, platform sensor assembly 35 includes a disk shaped bob-weight 37 suspended from a filament 45, four (4) light sources, such as light emitting diodes (LEDs) 39, and four (4) light sensors, such as photo diodes 41, all of which are connected to the control electronics 93 (FIG. 7) via respective cable assemblies 47 and 49. The four LEDs 39 are mounted to an upper support bracket 51 which has an annular opening (not shown) through which passes the filament 45. The LEDs 39 are arranged in opposed pairs on bracket 51, with one pair mounted parallel to transverse axis 29 and the other pair mounted parallel to longitudinal axis 33. Similarly, each of the four photo diodes 41 is mounted to a lower support bracket 53 in opposed relation to each of the LEDs 39, as best seen in FIG. 2, and are also arranged in respective pairs along axes 29' and 33' that are parallel to the transverse and longitudinal axes 29 and 33, as best seen in FIG. 4. Accordingly, when the platform 23 is level, bob-weight 37 partially occludes each of the photo diodes 41, so that each diode 41 receives an equal amount of light from each respective opposed LED 39. However, if the platform 23 is not level, the bob-weight will be displaced to position 37', which changes the amount of light incident on each photo diode 41. As will be explained in more detail below, the control electronics 93 sense this changed amount of incident light and actuate the respective transverse and longitudinal servo motors 27 and 31 until the bob-weight is again in position 37, thus leveling the platform.

Figure 5:
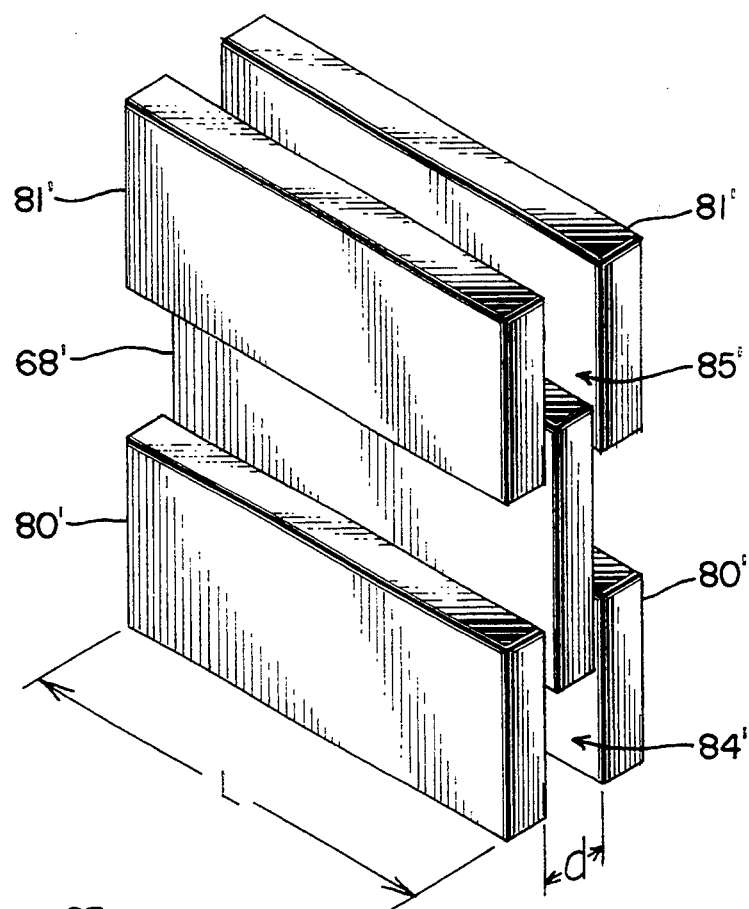
FIG. 5 is a diagrammatic view of the four plate conductor and dielectric system.

As noted above, the gross tune adjustment or calibration of gravity meter 10 is accomplished by means of an adjusting screw 74 and reset spring 70. Fine tune adjustment and subsequent gravity field measurement is accomplished by the first and second pairs of conductor plates 80 and 81 and dielectric plate 68, along with the optical detector system 15. Referring now to FIG. 5, the four plate conductor and dielectric system according to the present invention is diagrammatically shown being defined by two pairs of conductor plates 80' and 81' and a dielectric plate 68'. Each pair of conductor plates 80' and 81' have a length L and are separated by a distance d and define respective first and second cavities 84' and 85' therebetween. As is well-known, an electric potential applied between a given pair of plates, such as first pair 80' will generate a body force which tends to draw dielectric plate 68' into cavity 84', as such positioning would reduce the total energy of the system. An explanation of the physics of such a capacitor/dielectric system may be found in *Cheston, Elementary Theory of Electric and Magnetic Fields,* 119–131 (1974 John Wiley & Sons, Inc.). Specifically, ignoring the edge effects of the electric field, the force applied to dielectric plate 68' varies with the square of the electric potential applied to the conductor plates, with the equation being expressed as follows:

$$F = \frac{1}{2} \frac{\epsilon_0 L}{d} (K - 1) V^2 \qquad (1)$$

where:
F = body force on the dielectric plate;
$\epsilon_0$ = free space permittivity constant;
L = length of the conductor plate;
V = electric potential between the plates;
K = dielectric constant of the dielectric plate; and
d = distance between the conductor plates.

The foregoing Equation (1) applies to a single pair of conductor plates separated by a single dielectric plate, with the body force F being proportional to the square of the voltage V impressed on the plates. However, by adding a second pair of conductor plates, such as pair 81', it is possible to linearize Equation (1), so that the body force is linearly proportional to the impressed voltage V. As mentioned above, a linear relation between the body force F and the voltage V applied to the plates allows for easier and more accurate determination of the body force required to renull the weight arm, thus the change in the gravitational field. If such an upper pair of plates 81' is added to come up with the arrangement of the preferred embodiment and shown diagrammatically in FIG. 5, the equation describing the body force on the dielectric plate 68' becomes:

$$F_{net} = \frac{1}{2} \frac{\epsilon_0 L}{d} (K - 1)(V_t^2 - V_b^2) \qquad (2)$$

where:
$F_{net}$ = net body force on the dielectric plate;
$\epsilon_0$ = free space permittivity constant;
L = length of the conductor plates;
$V_t$ = electric potential between the top pair of plates;
$V_b$ = electric potential between the bottom pair of plates;
K = dielectric constant of the dielectric plate; and
d = distance between the conductor plates.

If the voltage placed between the top pair of plates 81' is some constant voltage $V_0$ plus a small, but variable voltage $\delta$, i.e., $V_t = (V_0 + \delta)$, and if the voltage between the bottom pair of plates 80' is the same constant voltage $V_0$, but less the same variable voltage $\delta$, i.e., $V_b = (V_0 - \delta)$, Equation (2) can be linearized to give:

$$F_{net} = \frac{1}{2} \frac{\epsilon_0 L}{d} (K - 1)(4 V_0 \delta) \qquad (3)$$

Thus, in the four plate conductor/dielectric system, the net body force $F_{net}$ on the dielectric plate 68' is linearly related to the variable voltage $\delta$, where the voltage impressed on the top pair of plates 81' is $(V_0 + \delta)$ and the voltage impressed on the bottom pair of plates 80' is $(V_0 - \delta)$. This body force, then, may be used to balance or null the gravity meter once it is in position. Specifically, after setting the range of the meter 10 by means of screw 74 and spring 70, the meter can be lowered into a bore hole to a desired zone and, after leveling the platform 23, can then be fine tuned by varying the electric potential on the conductor plates 80 and 81 so that a null condition is established.

In former devices, gravity measurement was accomplished by balancing the force of gravity with the restoring force of the mainspring, such as mainspring 48. The general equations for the torque due to gravity $T_g$ and the torque due to the mainspring $T_s$ are as follows:

$$T_g = gcm \sin \beta \qquad (4)$$

$$T_s = kab \sin \alpha \qquad (5)$$

where:
g = acceleration due to gravity;
c = distance between the pivot point of the weight arm and its center of mass;
m = total mass of the weight arm;
k = spring constant of the mainspring;
a = distance between the pivot point of the weight arm and the position of the mainspring (point 58);
b = distance between the pivot point of the weight arm and the bottom of the mainspring;
$\beta$ = angle between distance line e and g; and
$\alpha$ = angle between distance line a and b.

A nulled condition is present when $T_g = T_g$. These torques are dependent on the various angles interrelating the weight arm, the center of mass moment, and the mainspring, which, as is known in the art, can be made to cancel out of the general equations by selecting the correct geometry for the system.

The present invention introduces a third parameter, $T_c$ into the torque equations, with the parameter being the torque generated by the body force when an electric potential is placed between the first and second pairs of conductors 80 and 81. As described above, such potential creates a force tending to draw dielectric plate 68 into either cavity 84 or 85, depending on the magnitude and sign of the variable voltage $\delta$. A nulled condition is thus established when $T_g = T_s - T_c$. Accordingly, when the present invention is operated, a first nulled condition is established wherein these forces are balanced. The device is then moved to a second location and renulled. Since $T_s$ is held constant, the change in $T_g$ is directly proportional to the change in $T_c$ required to renull the meter. $T_c$ in turn is linearly proportional to the electric potential $V_0$ and $\delta$ placed on the first and second pairs of conductors 80 and 81, respectively. Therefore, by measuring the change in $\delta$ necessary to have a hulled condition at two different locations, or over a period of time, the change in the torque caused by gravity, thus the change in the gravitational field, can be calculated according to standard physical equations. As described below, the nulled condition is detected by the optical detector system 15 comprising light source assembly 95, detector assembly 97, and control electronics 93.

Figure 6:
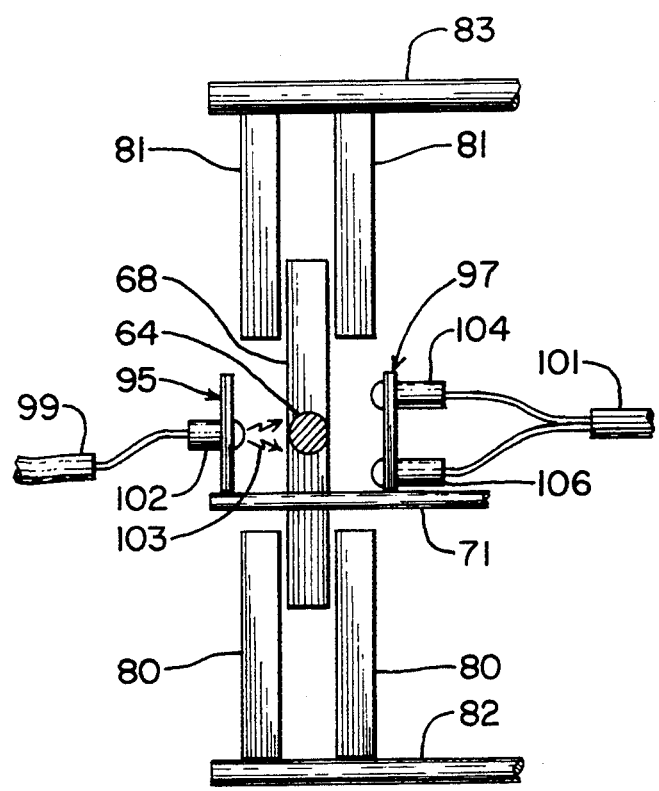
FIG. 6 is a side view in elevation of the four plate conductor and dielectric system and the optical detector system portions of the gravity meter taken along the line 6—6 of FIG. 2.

Referring now to FIG. 6, the optical detector system 15 comprises a light source assembly 95 and a light detector assembly 97 mounted in spaced relation on opposite sides of weight arm 64 and held in position by support beam 71. Light source assembly 95 includes a light source, such as light emitting diode (LED) 102 for directing a light beam 103 towards an upper light detector 104 and a lower light detector 106, both of which are mounted to light detector assembly 97. The position of weight arm 64 is determined by measuring the difference between the amount of light incident on each detector. When equal amounts of light from the light emitting diode 102 reach each detector, the weight arm 64 is in a nulled position. When the weight arm 64 is displaced above the nulled position, mote light from LED 102 will reach the bottom detector 106 and the control electronics 93 will detect the elevated position of the weight arm 64. Conversely, when weight arm 64 is displaced below the nulled position, more light from LED 102 will reach the top detector 104, indicating; that the weight arm is below the generates an output signal related to the amount of light incident on each detector 104 and 106. The analog output signal from the differential detector 108 is amplified by an amplifier 116a before being fed into microprocessor 114. In the preferred embodiment, microprocessor 114 is a XC68HC805B6FN manufactured by Motorola Corporation. As was described above, microprocessor 114 uses the difference signal from differential detector 108 to compute the position of the weight arm 64 and then uses that computed position to determine the voltage increment $\delta$ required to move the weight arm 64 back to the nulled position. In doing so, microprocessor 114 will take into account the particular construction of the gravity meter and the resulting system response criteria, which were previously programmed into the memory (not shown) accessed by microprocessor 114. Finally, the data relating to the magnitude of the incremental voltage $\delta$ are converted into analog signals by a digital-to-analog (D/A) converter 118. In the preferred embodiment, D/A converter 118 generates an analog current signal 120 for the upper plates 81 and a separate analog current signal 122 for the lower plates 80. These analog current signals are converted to voltage signals by respective current to voltage converters 124 and 126, which may be conventional operational amplifiers configured to operate as current to voltage converters, as is well-known. Each voltage signal is then amplified by respective amplifiers 128 and 130, before being fed into a chopper circuit 132, which converts each respective amplified DC voltage signal into an AC square wave signal, which AC signal is then imposed on each respective pair of plates to eliminate static build-up, drift, and other problems that would be associated with imposing DC voltages on the plates. In the preferred embodiment, the square wave signals that are imposed on the upper and lower plates 81, 80, respectively, have frequencies in the range of about 10 KHz.

Microprocessor 114 also detects the amplified signals from the transverse differential detector 110 and longitudinal differential detector 112 after amplification by amplifiers 116b and 116c, respectively, and generates control signals to actuate the nulled position.

The control electronics 93 receive data from the various sensors and perform a variety of functions. Specifically, the control electronics 93 maintain the gravity meter 10 in a level position by actuating the transverse and longitudinal servo motors 27 and 31, respectively, in response to the position of the bob weight 37 sensed by the light sensors 41. The control electronics also sense the position of the weight arm 64 and determine the correct voltage $\delta$ to be applied to the four plate conductor/dielectric nulling system 17.

Figure 7:
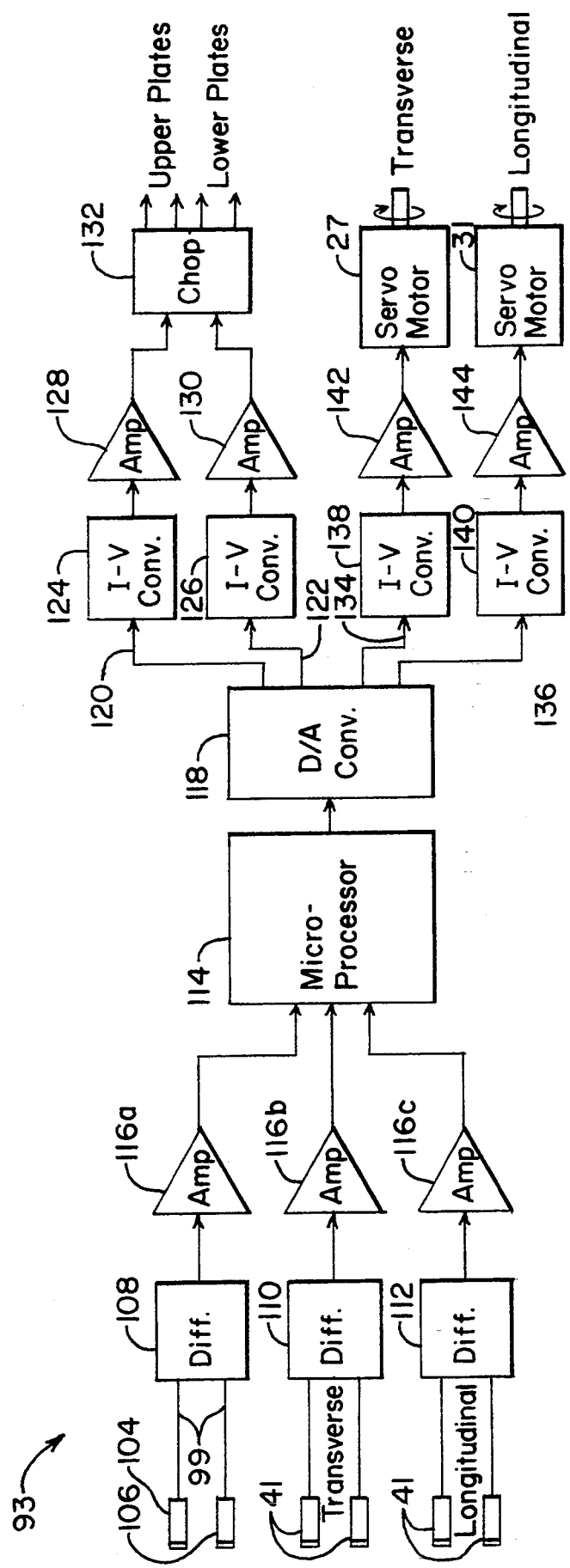
FIG. 7 is a block diagram of the control electronics of the gravity meter according to the present invention.

Referring now to FIG. 7, the control electronics 93 generally comprise three (3) differential detector circuits 108, 110, and 112 which detect the difference between the amount of light incident on each of the weight arm detectors 104 and 106, as well as the platform sensor assembly detectors 41. A microprocessor 114, processes data (in the from of signals from differential detector 108) from the optical detector system 15 and calculates, among other things, the voltage increment $\delta$ required to renull the weight arm 64. Microprocessor 114 also processes data from the platform sensor assembly 35, which data are in the form of signals from transverse differential detector 110 and longitudinal detector 112, and controls the operation of each respective servo motor 27 and 31. In the preferred embodiment, the control electronics 93 comprise various combinations of "standard" circuits that are well-known in the art for performing certain defined functions. Since such circuits could be easily constructed by persons having ordinary skill in the art after becoming familiar with the functions performed by the control electronics 93 of the present invention, the "standard" circuits of control electronics 93 will only be described on a functional level, as opposed to a detailed, component-by-component level.

The differential detector 108 for the optical position detector portion of control electronics 93 includes a conventional operational amplifier connected as a difference amplifier which respective servo motors 27 and 31 and level the platform 23, thus gravity meter 10. More specifically, respective transverse and longitudinal control signals 134 and 136 generated by microprocessor 114 pass through respective transverse and longitudinal current to voltage converters 138 and 140 and respective amplifiers 142 and 144, before being fed into the transverse and longitudinal servo motors 27 and 31. Microprocessor 114 is, of course, programmed to move the respective servo motor in response to the position of the bob weight 37, as is well-known, and as would be obvious to persons having ordinary skill in the art.

The method of the present invention requires that the gravity meter 10 be positioned at a first location and nulled. Nulling of the gravity meter is accomplished by the control electronics 93, as described above, which varies the electric potential on the first and second pairs of plates 80 and 81 until $T_g = T_s - T_e$, which condition is detected by monitoring the output from the optical position detector system 15, which senses when the beam 64 is in the hulled position. The gravity meter 10 is then moved to a second location and renulled in the foregoing manner. While the nulling and renulling can be made with the weight arm 64 at different positional locations, in typical operation, the measurement would take place with the arm 64 at a single positional location as detected by the optical detecting system 15. The change in electrical potential δ required to renull the system corresponds to the change in the gravitational field.

This concludes the detailed description of the preferred embodiment of the improved nulling and measuring system of the present invention. Note that while only one particular arrangement for the weight beam suspension assembly has been shown and described herein, the improved nulling and measuring system according to the present invention can be used with equal effectiveness with other types of weight arm suspension assemblies, as would be obvious to persons having ordinary skill in the art. For example, numerous gravity meters are known that utilize different weight arm suspension assemblies that have different components or different arrangements of components, but all of which measure changes in gravitational fields by sensing the positions of moveable weights. Therefore, the improved hulling and measuring system should not be regarded as being limited to the particular weight arm suspension assembly shown and described herein.

Consequently, the foregoing should be considered illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to as falling within the scope of the invention as defined by the claims which follow.

The embodiments of the invention in which an exclusive property or privilege is claimed are defined as follows:

1. In a gravity meter mounted to a rigid framework and having a reaction mass mounted on a weight beam coupled to a suspension system whereby said weight beam is alternatively moveable in a first direction and a second direction in response to changes in the ambient gravitational field, the improvement comprising;
a nulling assembly including a dielectric mass, a first pair of spaced-apart conductors and a second pair of spaced-apart conductors, said dielectric mass being rigidly secured to said weight beam for movement in the plane of movement of said weight beam, said first and second pair of conductors being rigidly and immovably secured to said framework, said first pair of conductors having a first cavity therebetween and being located and positioned parallel to and on opposite sides of said plane with a portion of said dielectric mass extending into said first cavity, said second pair of conductors having a second cavity therebetween and being located and positioned parallel to and on opposite sides of said plane and oriented relative to said first pair of conductors such that a portion of said dielectric mass also extends into said second cavity, movement of said beam in saint first direction causing corresponding transverse movement of said dielectric mass in said plane into said first cavity and out of said second cavity and movement of saint weight beam in said second direction causing corresponding transverse movement of saint dielectric mass in said plane out of said first cavity and into said second cavity, and the nulling assembly further includes means connected to said first and second pairs of conductors for varying and measuring the electric potential therebetween.

2. The improved gravity meter of claim 1, wherein said dielectric mass and said first and second pairs of conductors are flat plates, said first pair of conductors being oriented in parallel, spaced-apart relation to one another and said second pair of conductors being oriented in parallel, spaced-apart relation to one another.

3. The improved gravity meter of claim 2, wherein said dielectric mass defines part of said reaction mass.

4. The improved gravity meter of claim 3, including a light source mounted to said framework and positioned adjacent to one side of said weight beam, light detector means mounted to said framework and positioned adjacent to the other side of said weight beam, opposite said light source, for detecting light from said light source and generating an output signal, and means connected to said light detector means for determining the position of said weight beam in said first plane based on the output signal from said light detector means.

5. The improved gravity meter of claim 4, including computing means connected to said means connected to said first and second pairs of conductors for varying and measuring the electric potential therebetween and to said means connected to said light detector means for determining the position of said weight beam for adjusting the electric potential on said first and second pairs of conductors in response to the position of said weight beam and for computing changes in the ambient gravitational field.

6. A gravity meter for measuring changes in ambient gravitational fields, said meter mounted to a rigid framework and comprising:
a suspension system;
a weight beam which is pivotably mounted to the suspension system whereby said weight beam is pivotably moveable in a plane in response to changes in the ambient gravitational field; and
an optical position sensor assembly including a light source mounted to said framework and positioned adjacent to one side of said weight beam, light detector means mounted to said framework and positioned adjacent to the other side of said weight beam, opposite said light source, for detecting light from said light source and generating an output signal, and means connected to said light detector means for determining the pivotal position of said weight beam in said plane based on the output signal from said light detector means;

wherein said light source is a light emitting diode and wherein said light detector means includes a first light detector and a second light detector mounted in spaced relation above and below said weight beam, respectively, when said weight beam is in a nulled position;

wherein said means connected to said light detector means for determining the position of said weight beam includes a differential detector for generating said output signal, wherein said output signal is a difference signal representative of the difference between the amount of light incident on said first light detector and incident on said second light detector.

7. A gravity meter for measuring changes in ambient gravitational fields, comprising:
  a housing assembly;
  a support framework mounted to said housing assembly;
  a first pair of hinge members supporting a first spindle on opposite ends thereof in spaced relation to said framework, said first spindle being pivotably mounted at either end to said first pair of hinge members along a first axis to alternatively allow for pivotal movement in a first direction and a second direction;
  a second pair of hinge members supporting a second spindle on opposite ends thereof in spaced relation to said framework, said second spindle being pivotably mounted at either end to said second pair of hinge members along a second axis substantially parallel to said first axis;
  a weight beam attached to said first spindle and extending radially outward therefrom, said weight beam supporting a reaction mass;
  a mainspring arm attached to and extending radially outwardly from said first spindle in a direction generally toward said second spindle, said arm having a fixed end and a free end with the fixed end attached to said first spindle;
  a mainspring support framework attached to and extending radially outwardly from said second spindle said framework having a fixed end and a free end with the fixed end attached to said second spindle;
  a mainspring interconnecting the free ends of said mainspring arm and said mainspring support frame member;
  adjustment means connected to said second spindle for applying adjustable torque to said second spindle; and
  a first pair of spaced-apart conductors and a second pair of spaced-apart conductors, said first pair of conductors having a first cavity therebetween and said second pair of conductors having a second cavity therebetween and wherein said reaction mass includes a portion formed of a dielectric material, said first and second pairs of conductors being mounted on said support framework adjacent said weight beam and a portion of said reaction mass extending into both said first and second cavities, whereby movement of said weight beam in the first direction causes corresponding movement of said reaction mass into said first cavity and out of said second cavity and movement of said weight beam in the second direction causes corresponding movement of said reaction mass out of said first cavity and into said second cavity.

8. The gravity meter of claim 7, further including means associated with said first and second pairs of conductors for applying a variable electric potential thereto, position sensor means for sensing the position of said weight beam, and means connected to said variable electric potential applying means and connected to said position sensor means for varying the electric potential on said first and second pairs of conductors in response to the position of said weight beam and for calculating changes in the ambient gravitational field.

9. In a gravity meter adapted for reading changes in an ambient gravitational field and having a support framework and weight beam including a dielectric mass coupled thereto, said weight beam movably coupled to a suspension system to allow alternative movement in a first direction and a second direction, the method of adjusting and reading said meter comprising the steps of:
  positioning the gravity meter at a first location;
  nulling the meter to a first equilibrium state by applying an electric potential to a first pair of spaced-apart conductors and a second pair of spaced-apart conductors mounted adjacent said dielectric mass and defining a first cavity and a second cavity, respectively, and positioned so that movement of the weight beam in the first direction causes said dielectric mass to move into said first cavity and out of said second cavity, and movement of the weight beam in the second direction causes said dielectric mass to move out of said first cavity and into said second cavity, whereby said weight beam is made motionless;
  exposing the meter to a change in gravitational field;
  renulling the meter to a second equilibrium state by varying the electric potential on said first and second pairs of conductors, whereby said weight beam is again made motionless; and
  measuring the change in electric potential on said first and second pairs of conductors between said first and second equilibrium states.

10. The method of claim 9, wherein said first and second equilibrium states are determined by detecting the position of said weight beam.

11. The method of claim 10, wherein said nulling and renulling steps are accomplished by varying the electric potential on said first and second pairs of conductors to move said weight beam to the same position during each of said nulling and renulling steps.

* * * * *

UNITED STATES PATENT AND TRADEMARK OFFICE
CERTIFICATE OF CORRECTION

PATENT NO. : 5,440,928
DATED : August 15, 1995
INVENTOR(S) : Lautzenhiser et al.

It is certified that error appears in the above-indentified patent and that said Letters Patent is hereby corrected as shown below:

| Col. | Line | |
|---|---|---|
| 1-2 | 68-1 | "unique hulling and sensor system to allow remote hulling of the gravity meter" should read --unique nulling and sensor system to allow remote nulling of the gravity meter-- |
| 3 | 10-11 | "the weight beam can be moved to a hulled position." should read --the weight beam can be moved to a nulled position.-- |
| 3 | 49 | "preferred embodiments of me present invention," should read --preferred embodiments of the present invention,-- |
| 8 | 66 | "$T_g = T_g$." should read --$T_g = T_s$.-- |
| 9 | 4-5 | "a third parameter, $T_c$" should read --a third parameter, $T_e$-- |

UNITED STATES PATENT AND TRADEMARK OFFICE
CERTIFICATE OF CORRECTION

PATENT NO. : 5,440,928                              Page 2 of 3
DATED      : August 15, 1995
INVENTOR(S) : Lautzenhiser et al.

It is certified that error appears in the above-indentified patent and that said Letters Patent is hereby corrected as shown below:

| | | |
|---|---|---|
| 9 | 21-22 | "by measuring the change in $\delta$ necessary to have a hulled condition" should read --by measuring the change in $\delta$ necessary to have a nulled condition-- |
| 9 | 44-45 | "mote light from LED 102" should read --more light from LED 102-- |
| 11 | 16 | "beam 64 is in the hulled position." should read --beam 64 is in the nulled position.-- |
| 11 | 41 | "the improved hulling and measuring system" should read --the improved nulling and measuring system-- |
| 12 | 11-12 | "movement of said beam in saint first direction" should read --movement of said beam in said first direction-- |

UNITED STATES PATENT AND TRADEMARK OFFICE
CERTIFICATE OF CORRECTION

PATENT NO. : 5,440,928
DATED : August 15, 1995
INVENTOR(S) : Lautzenhiser et al.

It is certified that error appears in the above-indentified patent and that said Letters Patent is hereby corrected as shown below:

| Col. | Line | |
|---|---|---|
| 12 | 14-15 | "said second cavity and movement of saint weight beam" should read --said second cavity and movement of said weight beam-- |
| 12 | 16-17 | "transverse movement of saint dielectric mass" should read --transverse movement of said dielectric mass-- |

Signed and Sealed this

Eighteenth Day of June, 1996

BRUCE LEHMAN

Attesting Officer  Commissioner of Patents and Trademarks